(12) United States Patent
Karimli et al.

(10) Patent No.: US 11,546,279 B1
(45) Date of Patent: Jan. 3, 2023

(54) ENHANCEMENTS TO RICH COMMUNICATION GROUP MESSAGING

(71) Applicant: T-Mobile USA, Inc., Bellevue, WA (US)

(72) Inventors: Yasmin Karimli, Kirkland, WA (US); Hassan Raza, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 51 days.

(21) Appl. No.: 17/319,983

(22) Filed: May 13, 2021

(51) Int. Cl.
| | | |
|---|---|---|
| *H04W 4/00* | (2018.01) | |
| *H04L 51/066* | (2022.01) | |
| *H04L 51/04* | (2022.01) | |
| *H04W 4/14* | (2009.01) | |

(52) U.S. Cl.
CPC ............ *H04L 51/066* (2013.01); *H04L 51/04* (2013.01); *H04W 4/14* (2013.01)

(58) Field of Classification Search
CPC ......... H04L 51/066; H04L 51/04; H04W 4/14
See application file for complete search history.

(56) References Cited

U.S. PATENT DOCUMENTS

| | | | | |
|---|---|---|---|---|
| 2013/0268357 A1* | 10/2013 | Heath | ............... | G06Q 10/10 726/26 |
| 2014/0215078 A1* | 7/2014 | Seth | ............... | H04L 67/1078 709/226 |
| 2015/0189090 A1* | 7/2015 | Regan | ............... | H04M 3/53333 455/413 |
| 2016/0286027 A1* | 9/2016 | Lee | ............... | H04L 51/066 |
| 2020/0100100 A1* | 3/2020 | Raymond | ............... | H04L 69/24 |
| 2021/0014182 A1* | 1/2021 | Stafford | ............... | H04L 51/066 |

* cited by examiner

*Primary Examiner* — Johnny B Aguiar
(74) *Attorney, Agent, or Firm* — Lee & Hayes, P.C.

(57) ABSTRACT

A fifth generation (5G) network can provide Rich Communication Services (RCS) between multiple user equipment (UE) of different device types and/or different operating systems. An RCS server in an IP Multimedia Subsystem (IMS) can be used to format data associated with a chat between UEs having different operating systems. The RCS server can initiate, establish, maintain, format, augment, or otherwise determine a rich communication chat message between the UEs over the 5G network.

18 Claims, 6 Drawing Sheets

ENHANCEMENTS TO RICH COMMUNICATION GROUP MESSAGING

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques for communicating rich communication services (RCS) across different operating systems and/or device types over a 5G network are discussed herein. For instance, the techniques may be used to add or remove a user equipment (UE) from an RCS group chat by implementing a server that formats the RCS group chat based on user preferences or a group identification associated with UEs having different operating systems. In some examples, user preferences associated with a UE can be processed by an RCS server to configure an RCS open chat with another device having a different operating system. Using the techniques described herein, the RCS server can initiate, establish, maintain, format, augment, manage, or otherwise determine secure exchange of video, photos, or other RCS services in a group chat according to preferences associated with one or more devices, even when the devices have different operating systems.

In some examples, an RCS server can receive user preferences associated with a first UE having an Android operating system and configure an RCS message for exchange with a second UE having a non-Android operating system (e.g., Window Phone OS, Blackberry OS, iOS, and the like). In such examples, a user interface associated with a UE can receive indications for whether a user of the UE wishes to receive messages (e.g., text, video, file transfers, and so on) from certain devices in the group chat thereby enabling UEs of different types and/or operating systems to enter and exit an RCS group chat. The RCS server can receive the indications from the user interface to exit a group chat, enter a group chat, or identify device(s) for exchanging RCS services (e.g., switch between a handheld device or a personal computing device), just to name a few.

Implementing the RCS server to manage user preferences as described herein enables user equipment to save battery by reducing an amount of data exchanged during a group chat thereby enabling the 5G network to provide more signals to additional user equipment. The RCS communication techniques described herein can also alleviate incompatibilities between devices and operating systems than otherwise prevent a UE from leaving or entering an open RCS group chat (e.g., a group chat with devices of different operating system types). Implementing the RCS communication techniques as described herein can improve performance associated with the 5G network by enabling a UE to leave or join a group chat that otherwise is not possible due to differences between operating systems of UEs. Further, by not sharing RCS message data when undesired by a particular UE, the techniques can improve a user experience (e.g., not receiving unwanted data, etc.).

In some examples, the RCS server can establish and maintain real-time chat and file transfer between UEs of different types (e.g., different operating systems, manufacturers, etc.) using an RCS protocol. For instance, a UE can send a request for establishing an open group chat with one or more UEs to an RCS server. In such examples, the RCS server can identify an operating system associated with each of the one or more UEs based on an identifier associated with each respective UE. By doing so, the RCS server can format the group chat for recognition by each respective UE regardless of an operating system type associated with each UE (e.g., recognized by different operating systems) and determine an RCS protocol usable for sending the group chat comprising one or more RCS services. By implementing techniques as described herein, a user of the UE can choose which UEs in the group chat to exchange message data including removing their UE from the open group chat entirely thereby improving performance of the user equipment. The RCS server can, in various examples, configure RCS services for sending to UEs based on characteristics and/or settings of each UE regardless of a type of operating system used by the UE.

The systems and techniques disclosed herein may provide for processing larger amounts and/or more complex data by employing an RCS server that can generate and/or format a communication comprising a rich communication service (e.g., a chat, an image, a video, and so on) between a UE and at least one other UE of a different device type. In some examples, the RCS server may be part of an Internet Protocol (IP) Multimedia Subsystem (IMS), a short message service center (SMSC), and/or a multimedia message service center (MMSC) that can receive a request for a communication associated with one or more rich communication services from a UE, and use an RCS protocol, an SMS protocol, and/or an MMS protocol for sending the communication to one or more additional UEs. The IMS may also or instead configure the communication for sending to the UEs by identifying that another UE has a different operating system, and modifying the communication so that is it recognized as a group chat by the UEs regardless of operating systems used by the UEs. Further description of providing RCS services to UEs having different operating systems can be found throughout this disclosure including in the figures below.

Figure 1:
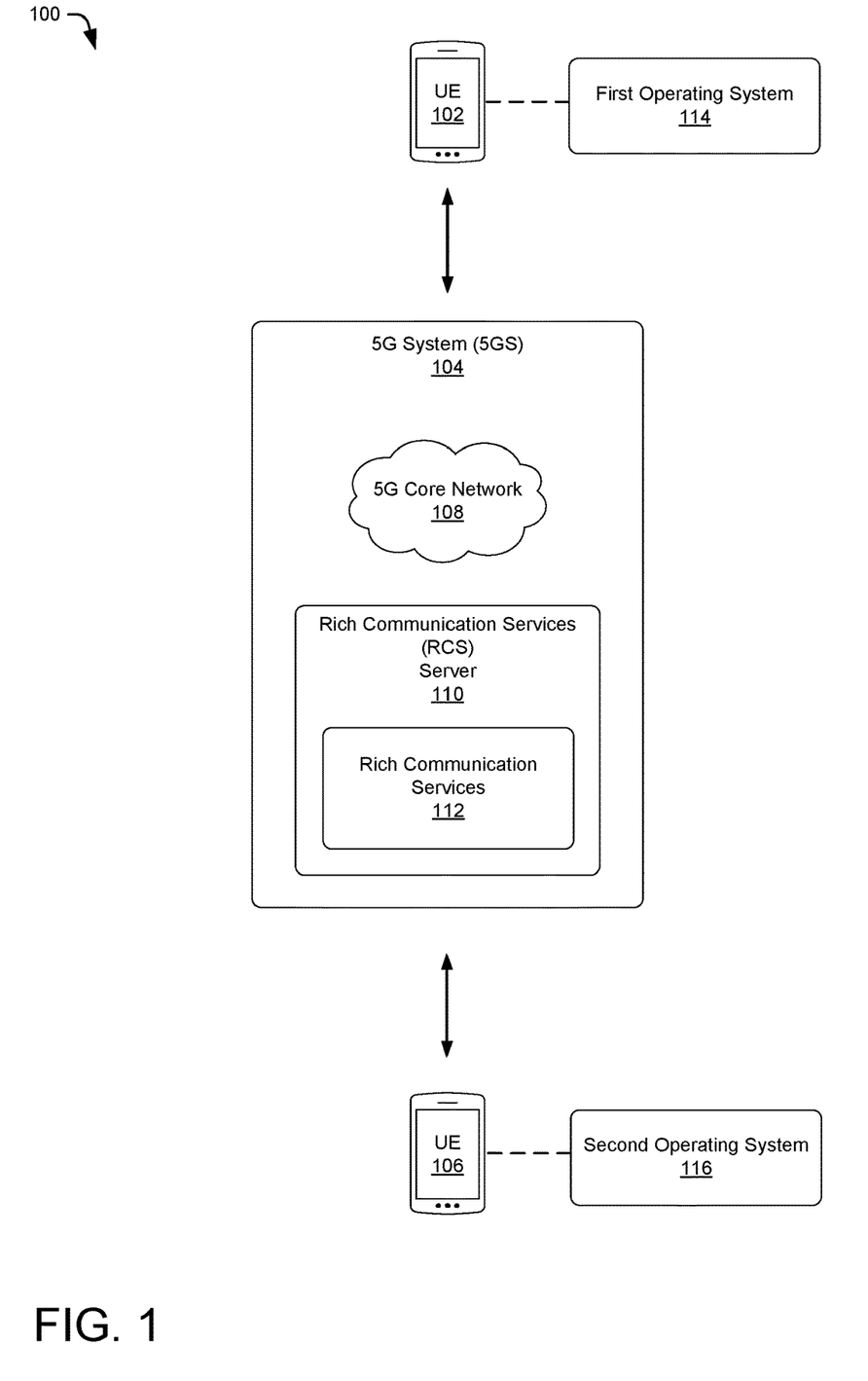
FIG. 1 depicts an example network environment in which a user equipment can connect to a telecommunication network to implement the techniques described herein.

FIG. 1 depicts an example network environment 100 in which an example user equipment (UE) can connect to a telecommunication network to engage in communication sessions for voice calls, video calls, messaging, data transfers, or other types of communications. For example, the UE 102 can connect to a 5G system 104 for sending a communication (e.g., a group chat) to one or more additional UEs (e.g., UE 106).

As depicted in FIG. 1, the 5G system 104 comprises a 5G core network 108 and a rich communications services (RCS) server 110 that is configured to provide rich communication services 112 between the UE 102 and the UE 106. In some examples, the UE 102 can generate a message that includes a connection request to establish a group chat with the UE 106. In such examples, the UE 102 can be associated with a first operating system 114 and the UE 106 can be associated with a second operating system 116 different from the first operating system 114. The message can be sent over the 5G core network 108 for processing by the RCS server 110 which can perform functionality as described herein including formatting the group chat for sending to the UE 102 and the UE 106 as a communication session over a unique channel. In some examples, the RCS server 110 can be coupled to or otherwise be incorporated as part of an IMS (not shown) and/or an SMSC (not shown).

Generally, the UE 102 and the UE 106 receives communications from the RCS server 110 in accordance with an RCS protocol, an SMS protocol, and/or an MMS protocol over the 5G core network 108. In some examples, the RCS server 110 can receive data from the UE 102 and/or the UE 106 indicating a request for a group chat and format messages between the UE 102 and the UE 106 as part of the group chat. The data can include a group identifier(s) that identify the UEs to be included in the group chat. In various examples, the RCS server 110 can determine the first operating system 114 associated with the UE 102 and the second operating system 116 associated with the UE 106 based at least in part on the group identifier(s) and format a group chat for recognition by the first operating system 114 (e.g., an Android operating system) and the second operating system 116 (e.g., a non-Android operating system).

In various examples, the RCS server 110 can initiate, establish, maintain, format, augment, manage, or otherwise determine secure exchange of text, video, photos in a group chat according to preferences associated with one or more UEs (e.g., the UE 102 and the UE 106). As mentioned, the RCS sever 110 can identify an operating system type (e.g., iPhone, Android, and the like) and configure a group chat for recognition by each device regardless of whether the devices have different operating systems (e.g., an open group chat). In some examples, the RCS server 110 can format an open group chat between UEs that includes one or more of: an RCS message, an SMS message, an MMS message, an iPhone message, or the like. In various examples, the preferences associated with one or more UEs can be received via a user interface to determine which device(s) to send and/or receive the chat, or portions of the chat (e.g., text but not video, text but not photos, just to name a few). In some examples, the preferences can indicate a time or location to change from a first device to a second device (e.g., changing from a mobile device to a computing device when arriving home from work as one non-limiting example).

In some examples, the RCS server 110 can configure and maintain a group chat regardless of whether the UE 102 and/or the UE 106 is from another telecommunications operator, carrier, or provider that may employ different types of telecommunications systems different from the 5G system 104.

The UE 102 and the UE 106 represent any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for the UE 102 and UE 106 is illustrated in greater detail in FIG. 6.

In various examples, the 5G system 104 can represent functionality to provide communications between the UE 102 and the UE 106, and can include one or more radio access networks (RANs), as well as one or more core networks linked to the RANs. For instance, a UE 102 can wirelessly connect to a base station or other access point of a RAN, and in turn be connected to the 5G core network 108. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi technology, and/or any other previous or future generation of radio access technology. In this way, the 5G system 104 is compatible to operate with other radio technologies including those of other service providers. Accordingly, a message in the group chat from the UE 102 may originate with another service provider (e.g., a third-party) and be processed by the RCS server 110 independent of the technolog(ies) or core network associated with the service provider.

In some examples, the 5G core network 108 can represent a service-based architecture that includes multiple types of network functions that process control plane data and/or user plane data to implement services for the UE 102. In some examples, the services comprise the rich communication services 112 which may include a text, a data file transfer, an image, a video, a combination thereof, and so on. The network functions of the 5G core network 108 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 2, and elsewhere.

Figure 2:
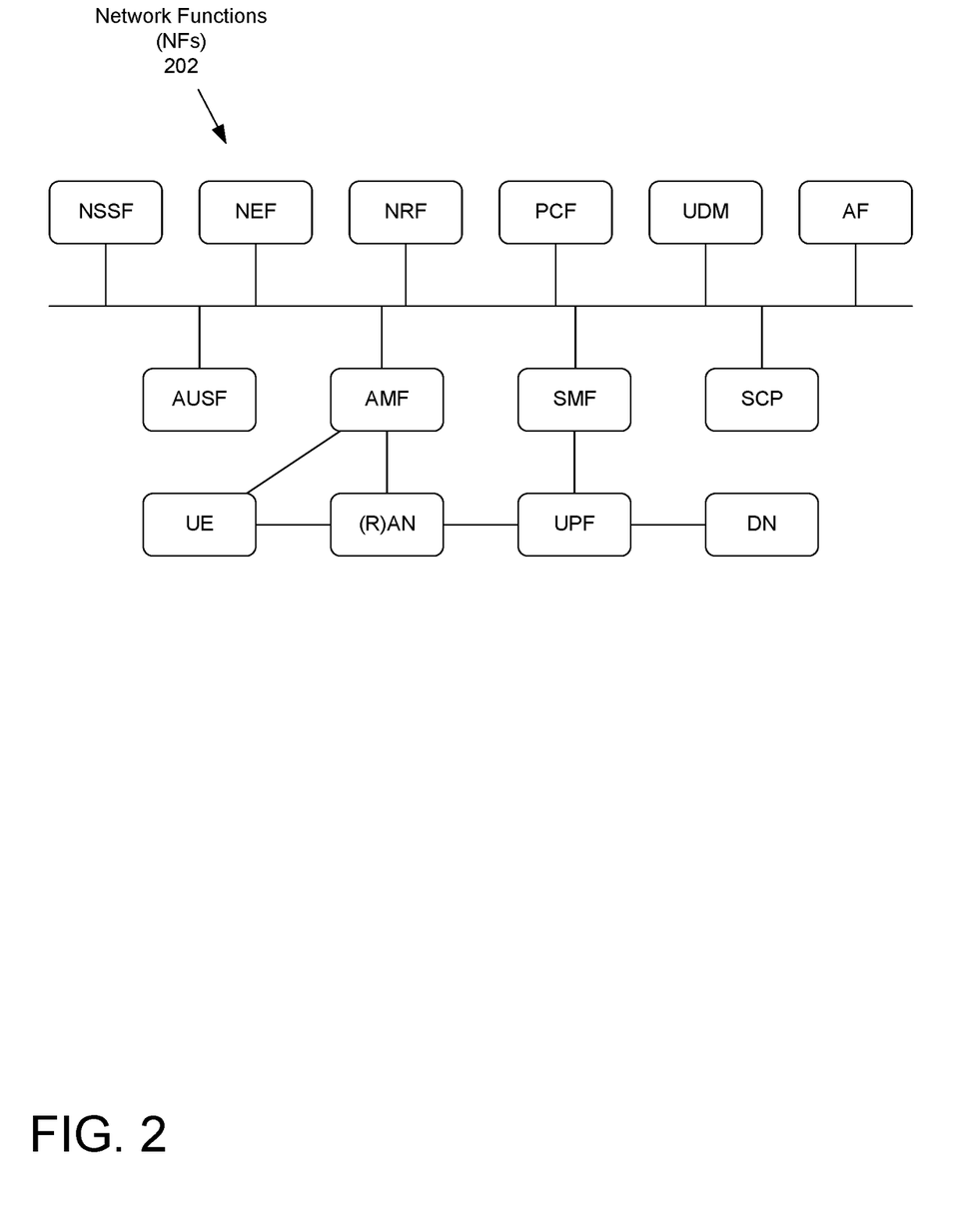
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 108 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 108), including an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G network 108 can be implemented as network applications that execute within containers (not shown). 5G NFs 202 can execute as hardware elements, software elements, and/or combinations of the two within telecommunication network(s), and accordingly many types of 5G NFs 202 can be implemented as software and/or as virtualized functions that execute on cloud servers or other computing devices. Network applications that can execute within containers can also include any other type of network function, application, entity, module, element, or node.

The 5G core network 108 can, in some examples, determine a connection between an Internet Protocol (IP) Multimedia Subsystem (IMS) that manages a communication session for the UE 102, including sessions for short messaging, voice calls, video calls, and/or other types of communications. For example, the UE 102 and the IMS can exchange Session Initiation Protocol (SIP) messages to set up and manage individual communication sessions.

Figure 3:
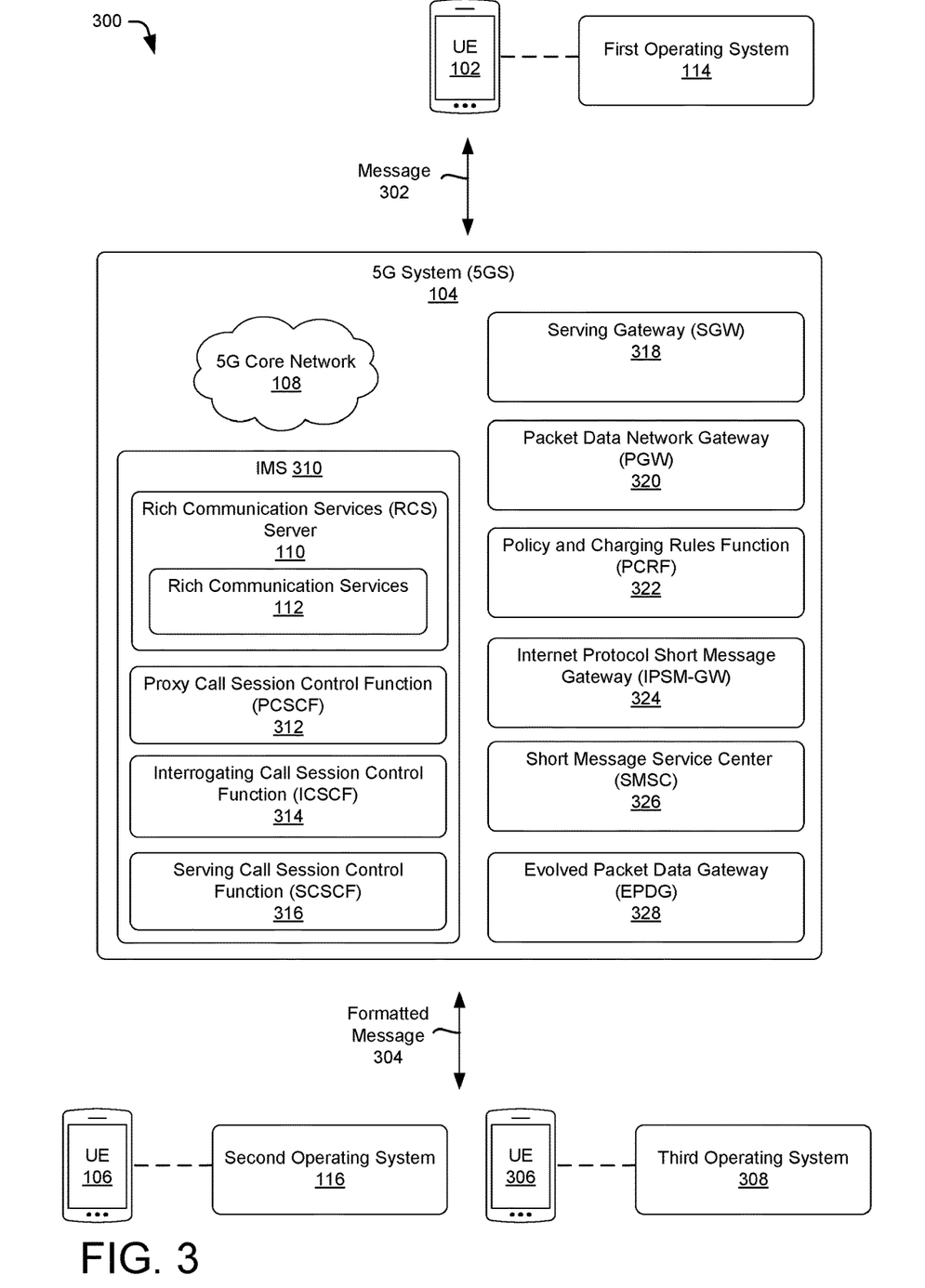
FIG. 3 depicts another example network environment in which a user equipment can connect to a telecommunication network to implement the techniques described herein.

FIG. 3 depicts another example network environment in which a user equipment can connect to a telecommunication network to implement the techniques described herein. As illustrated in FIG. 3, the UE 102 can communicate (e.g., send and/or receive) a message 302 to the 5G system 104 which can modify, configure, adjust, augment, or otherwise format the message 302 as a formatted message 304 for sending to the UE 106 and a UE 306 having a third operating system.

As shown in FIG. 3, the 5G system 104 comprises an IMS 310, which comprises a proxy call session control function (PCSCF) 312, an interrogating call session control function (ICSCF) 314, and a serving call session control function (SCSCF) 316. In various examples and as depicted in FIG. 3, the 5G system 104 also comprises a serving gateway (SGW) 318, a packet data network gateway (PGW) 320, a policy and charging rules function (PCRF) 322, and an internet protocol short message gateway (IPSM-GW) 324, a short message service center (SMSC) 326, and an evolved packet data gateway (ePDG) 328.

In some examples, the message 302 can represent a communication request from the UE 102 that includes one or more rich communication services (RCS) 112. For instance, the message 302 can include text, a video, an image, or a file related to group messaging (e.g., an open group chat and/or a closed group chat). The formatted message 304 can represent a modification made to the message 302 for compatibility with the UE 106 associated with the second operating system 116 and/or the UE 306 associated with the third operating system 308 (e.g., augment the message 302 such that the formatted message 304 is recognizable by the first operating system 114, the second operating system 116, and the third operating system 308). In various examples, the third operating system 308 can be a same operating system type as the first operating system 114 and/or the second operating system 116.

Generally, the IMS 310 can format the message 302 by determining operating systems of each device based at least in part on data associated with the message 302. For instance, the message 302 may comprise an identifier indicating which devices are to be included in the group chat, and the IMS 310 may determine the formatted message 304, and initiate sending of the formatted message 304 to the UE 106 and/or the UE 306 by way of the PCSCF 312, the ICSCF 314, and the SCSCF 316. In various examples, the IMS 310 can format the message 302 according to user preferences associated with a particular UE.

The PCSCF 312 can represent functionality of a proxy server that receives data from the UE 102 at the IMS 310. That is, the PCSCF 312 can establish and maintain communications between one or more UEs (including UEs of third-parties having unique communication requirements) and various answering points. The ICSCF 314 can represent functionality of a proxy server for routing of SIP messages to the SCSCF 316. The SCSCF 316, meanwhile, can represent functionality for session control routing of SIP messages including but not limited to receiving a subscriber profile from a Home Subscriber Server (HSS).

In some examples, providing the RCS services 112 as described herein can include implementing an evolved packet core (EPC) which includes at least the SGW 318, the PGW 320, a home subscriber network (HSS), a mobility management entity (MME), and an evolved packet data gateway (ePDG) 328. The techniques can also or instead employ the PCRF 322, the IPSM-GW 324, and/or SMSC 326 to configure and manage the RCS services 112 (e.g., an open group chat). As described herein, the SMSC 326 may be associated with a multimedia message service center (MMSC) and functionality provided by the SMSC 326 can include functionality associated with or otherwise provided by the MMSC. For instance, the formatted message 304 may comprise an SMS message, an RCS message, and/or an MMS message between the UE 102, the UE 106 and/or the UE 306.

In various examples, the RCS services 112 associated with the formatted message 304 can be communicated over the 5G system 104 (e.g. using the 5G core network 108) to the UE 106 and/or the UE 306 in substantially real-time. That is, given the capabilities of the 5G system 104 relevant to previous telecommunication networks, the IMS 310 can implement the RCS server 110 to provide the RCS services 112 between the UE 102 and the UE 106 and/or the UE 306. Accordingly, one or more users of one or more UEs can transfer text, a picture, a video, and/or a file of various size (e.g., 100 Kilobytes, 1 Megabyte, 5 Megabytes, 10 Megabytes, and so on) among one another as part of a group chat.

Figure 4:
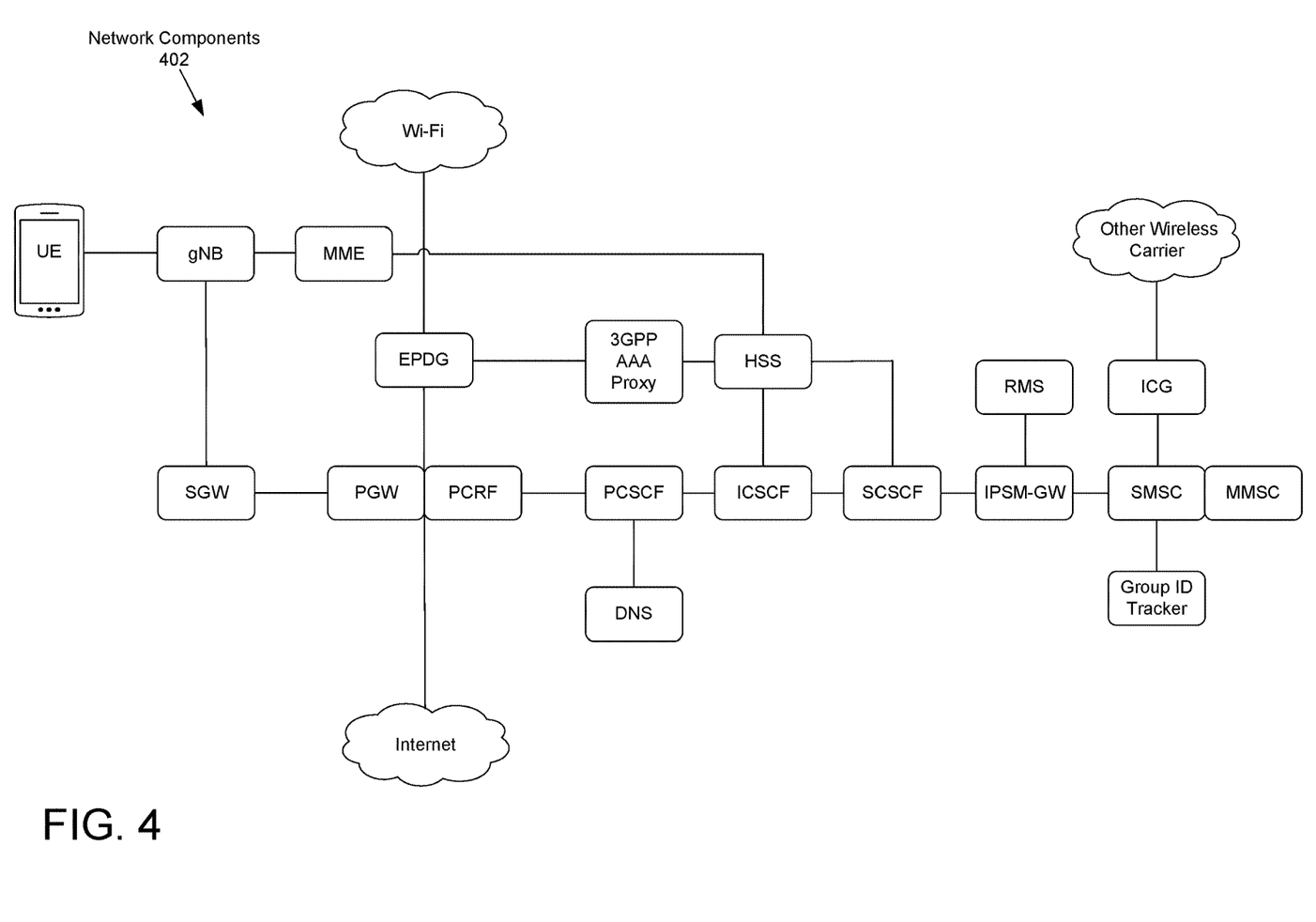
FIG. 4 depicts another example system architecture for a fifth generation (5G) telecommunication network.

FIG. 4 depicts another example system architecture for a fifth generation (5G) telecommunication network. In some examples, the telecommunication network can comprise the 5G core network 108 in FIG. 1 that includes a service-based system architecture in which different types of network components 402 operate alone and/or together to implement services. For instance, the network components 402 can comprise network functions, hardware, software, a combination thereof, or other implementations.

As shown in the example system architecture of FIG. 4, the network components 402 that can be associated with 5G telecommunication networks (e.g., the 5G core network 108) comprises one or more of: User Equipment (UE) (e.g., the UE 102, the UE 106, and/or the UE 306), a base station (gNB), a mobility management entity (MME), a home subscriber network (HSS), a 3GPP AAA proxy, and an evolved packet data gateway (ePDG) (e.g., the ePDG 328), a serving gateway (SGW) (e.g., the SGW 318), a packet data network gateway (PGW) (e.g., the PGW 320), a policy and charging rules function (PCRF) (e.g., the PCRF 322), a proxy call session control function (PCSCF) (e.g., the PCSCF 312), an interrogating call session control function (ICSCF) (e.g., the ICSCF 314), a serving call session control function (SCSCF) (e.g., the SCSCF 316), a domain name system (DNS), an internet protocol short message gateway (IPSM-GW) (e.g., the IPSM-GW 324), a short message service center (SMSC) (e.g., the SMSC 326), a multimedia message service center (MMSC), a resource management system (RMS), a group identifier tracker, and an inter-carrier gateway (ICG).

In some examples, the example system architecture of FIG. 4 can implement techniques to provide RCS services between one or more UEs as an open group chat. For instance, a message from a UE (e.g., the message 302 from the UE 102) may comprise an indication to establish or change an RCS service, an SMS message, an MMS message, an iMessage, and the like between UEs having different operating systems (e.g., Windows, macOS, iOS, Linux, and the like).

In various examples, one or more of the network components 402 can be employed to format the message 302 received from the UE including generating and/or formatting a communication comprising a rich communication service (e.g., a chat, an image, a video, and so on) between a UE and at least one other UE of a different device type (e.g., Android, iPhone, etc.). In some instances, one or more UEs may be associated with a different wireless carrier via the ICG. For example, the UE 102 may send the message 302 to the RCS server 110 which can send the formatted message 304 to the UE 106 and/or the UE 306. Though the SMSC is illustrated in FIG. 4 individually, it is understood that the SMSC (of functionality provided therefrom) may be directly coupled to and/or integrated into an IMS core or an RCS server. However, in other examples functionality provided by the SMSC may be implemented as a system separate from the IMS (e.g., to provide RCS services to other network architectures and/or other network operators).

Figure 5:
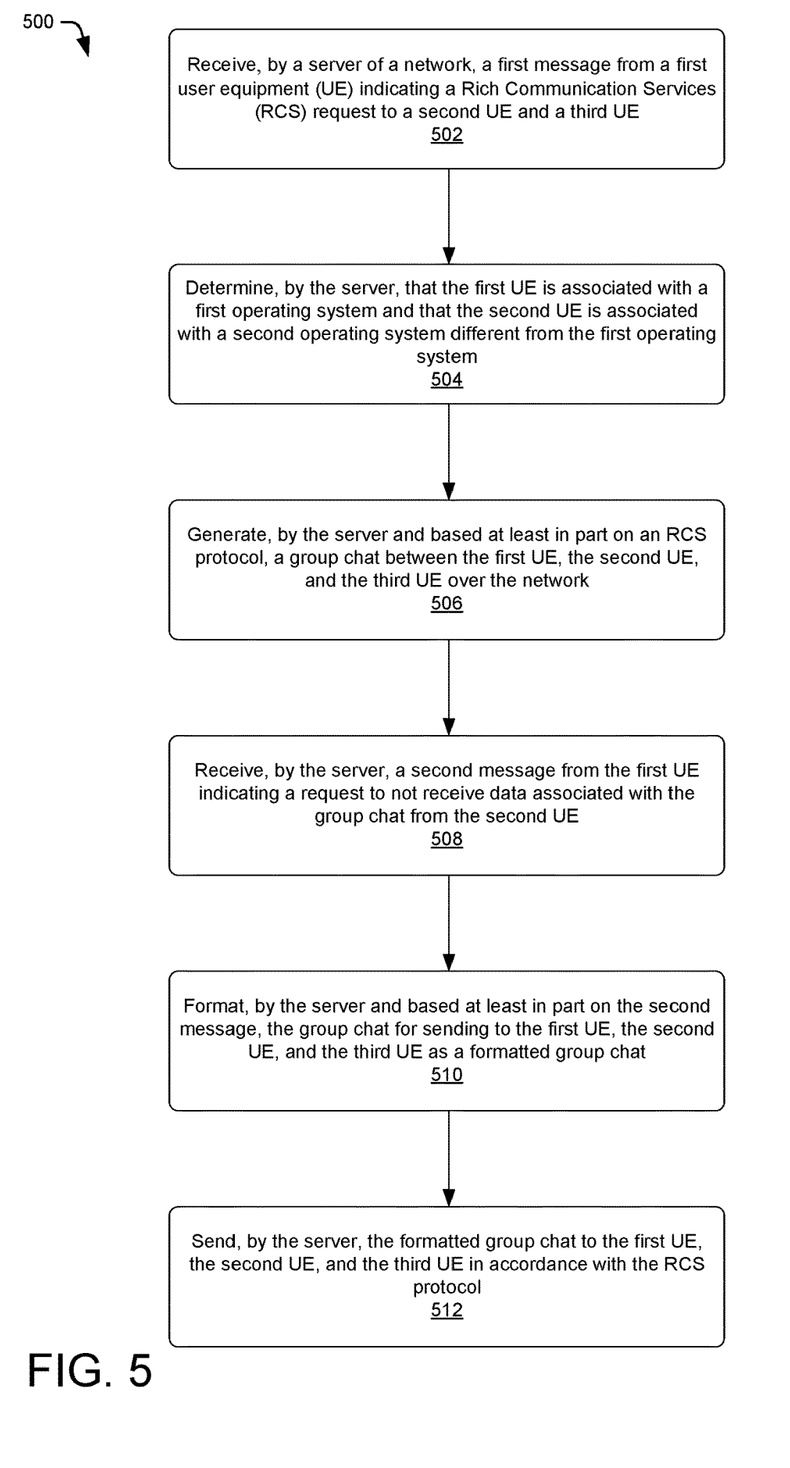
FIG. 5 depicts a flowchart of an example process for providing rich communication services between an example user equipment and an example public service access point.

FIG. 5 depicts a flowchart of an example process 500 for providing rich communication services between an example user equipment and an example public service access point. Some or all of the process 500 may be performed by one or more components in FIGS. 1-4 and 6, as described herein. For example, some or all of process 500 may be performed by the RCS server 110, the SMSC 326, and/or the IMS 310.

At operation 502, the process may include receiving, by a server of a network, a first message from a first user equipment (UE) indicating a Rich Communication Services (RCS) request to a second UE and a third UE. In some examples, the operation 502 may include the RCS server 110 and/or the SMSC 326 receiving a message from the UE 102 comprising one or more RCS services 112. By way of example and not limitation, a UE of a fifth generation system that includes a fifth generation core network can send a message comprising text, an image, a video, and/or a file transfer to the RCS server 110 requesting a communication session with one or more additional UEs.

In some examples, the message from the UE 102 can comprise a group identifier that indicates information about the UEs to receive the RCS service(s). For instance, the SMSC 326 can receive the group identifier and identify a first identification value, a second identification value, a third identification value, and so on, for each UE to be included in the RCS service 112 (e.g., the group chat). The identification value for each UE can indicate a device manufacture, device operating system, and other information pertaining to each UE.

In some examples, the operation 502 may include the RCS server 110 and/or the SMSC 326 receiving the message from the UE 102 indicating each UE in a group chat, and whether the UE 102 is to receive data (or not receive data) from particular UEs associated with the message. In this way, the UE can determine whether to get updates to an RCS service, such as a group chat, to control an amount of data exchanged (and ultimately an amount of battery used) which can enable a user of the UE to avoid receiving updates to the chat (e.g., avoid spam or other unwanted updates while saving battery capacity). In some examples, the amount of data exchanged between UEs can be determined in accordance with user preferences that indicate types of services, types of data, or other information associates with the chat.

The UE can provide the message to the RCS server 110 and/or the SMSC 326 from an application installed on the UE or other user interface that enables a user of the UE to input preferences associated with an active chat or chat being initiated. The RCS server 110 and/or the SMSC 326 can, for example, receive requests for a closed chat or an open chat from a native application associated with a particular operating system of the UE. Additionally or alternatively, the message from the UE can be received from a user interface (UI) configured by the RCS server 110 and/or the SMSC 326 for output on a display of the UE. In such examples, the UI can capture preferences of the user for a duration of the upcoming chat or active chat usable to enable the message to be formatted (e.g., determined, created, managed, and so on).

At operation 504, the process may include determining, by the server, that the first UE is associated with a first operating system and that the second UE is associated with a second operating system different from the first operating system. In some examples, the operation 504 may include identifying the first operating system associated with the first UE, the second operating system associated with the second UE, and so on, based at least in part on the group identifier associated with the message received from the UE. For example, group identifier can comprise the identification values of each UE indicating a device type and/or an operating system associated therewith. By accessing the group identifier from the message (such as from the group ID tracker in FIG. 4), the RCS server 110 and/or the SMSC 326 can determine how to configure the RCS services 112. In some instances, the group identifier can be saved (along with any associated user preferences) in a database, server, or other memory resource for access at a later time. In some examples, a UE may be added to or removed from the RCS services 112 based at least in part on accessing such information thereby enabling the RCS services to be configured in substantially real-time based on whether a UE indicates a preference to be added or removed from the RCS services 112. The UE may also provide an indication for whether to receive text, a photo, a video, and/or a file transfer from any UE in the chat (based on user preferences, for example).

At operation 506, the process may include generating, by the server and based at least in part on an RCS protocol, a group chat between the first UE, the second UE, and the third UE over the network. In some examples, the operation 506 may include generating an open group chat by augmenting, modifying, or otherwise altering the message for recognition by each operating system associated with each UE, even when the UEs have different operating systems. In various examples, the RCS server 110 and/or the SMSC 326 can identify an RCS protocol, an SMS protocol, and/or an MMS protocol suitable for sending the message to the first UE, the second UE, and the third UE over a 5G network including when the group chat is associated with an SMS message, an iMessage, or other message configuration. Though described in some examples as including three UEs, any number of UEs can be included in the group chat.

At operation 508, the process may include receiving, by the server, a second message from the first UE indicating a request to not receive data associated with the group chat from the second UE. In some examples, the operation 508 may include the first UE sending a message to be removed from an active group chat (either entirely or from a certain UE in the group chat). However, in other examples the RCS server 110 and/or the SMSC 326 can, in various examples, receive a single message (e.g., information about the first message and the second message may be a same message received at a single time) that indicates from which of the one or more UEs in the group chat to receive data.

At operation 510, the process may include formatting, by the server and based at least in part on the second message, the group chat for sending to the first UE, the second UE, and the third UE as a formatted group chat. In some examples, the operation 510 may include the RCS server 110 and/or the SMSC 326 formatting the message 302 and the formatted message 304 for sending over a 5G network (e.g., the 5G core network 108). For instance, the group chat can be formatted for sending to user equipment associated with different device types, difference carriers, and/or different operating systems. In some examples, the formatted message can comprise one or more of text, a photo, a video, a file, and the like. Accordingly, a group chat that is potentially incompatible with one of the UEs because of a difference in operating systems can instead be modified such that the UEs in the group chat can enter and exit from the group chat as desired without affecting another UE. By way of example and not limitation, the formatted group chat can enable a UE to leave the group chat even if the UE has a different operating system as another UE that is to remain in the group chat.

At operation 512, the process may include sending, by the server, the formatted group chat to the first UE, the second UE, and the third UE based at least in part on the RCS protocol. In some examples, the operation 510 may include the RCS server 110 sending the formatted group chat in which at least two of the UEs have a different operating system. In some examples, the first UE can indicate (based on preferences associated with the first message, the second message, or an additional message associated with an active group chat) a request to transfer data associated with the formatted group chat to another device associated with a same user as the first UE (e.g., to move all or a portion of the formatted group chat from the first UE to another UE, a tablet, computing device, or other device). In such examples, the RCS service 110 and/or the SMSC 326 can output the data associated with the formatted group chat to the other device based at least in part on the request. Alternatively, the first UE can send a request to receive formatted group chat data on more than one device associated with the user.

Implementing the RCS server to manage user preferences as described herein enables user equipment to save battery by reducing an amount of data exchanged during a group chat thereby enabling the 5G network to provide more signals to additional user equipment. The RCS communication techniques described herein can also alleviate incompatibilities between devices and operating systems than otherwise prevent a UE from leaving or entering an open RCS group chat.

Figure 6:
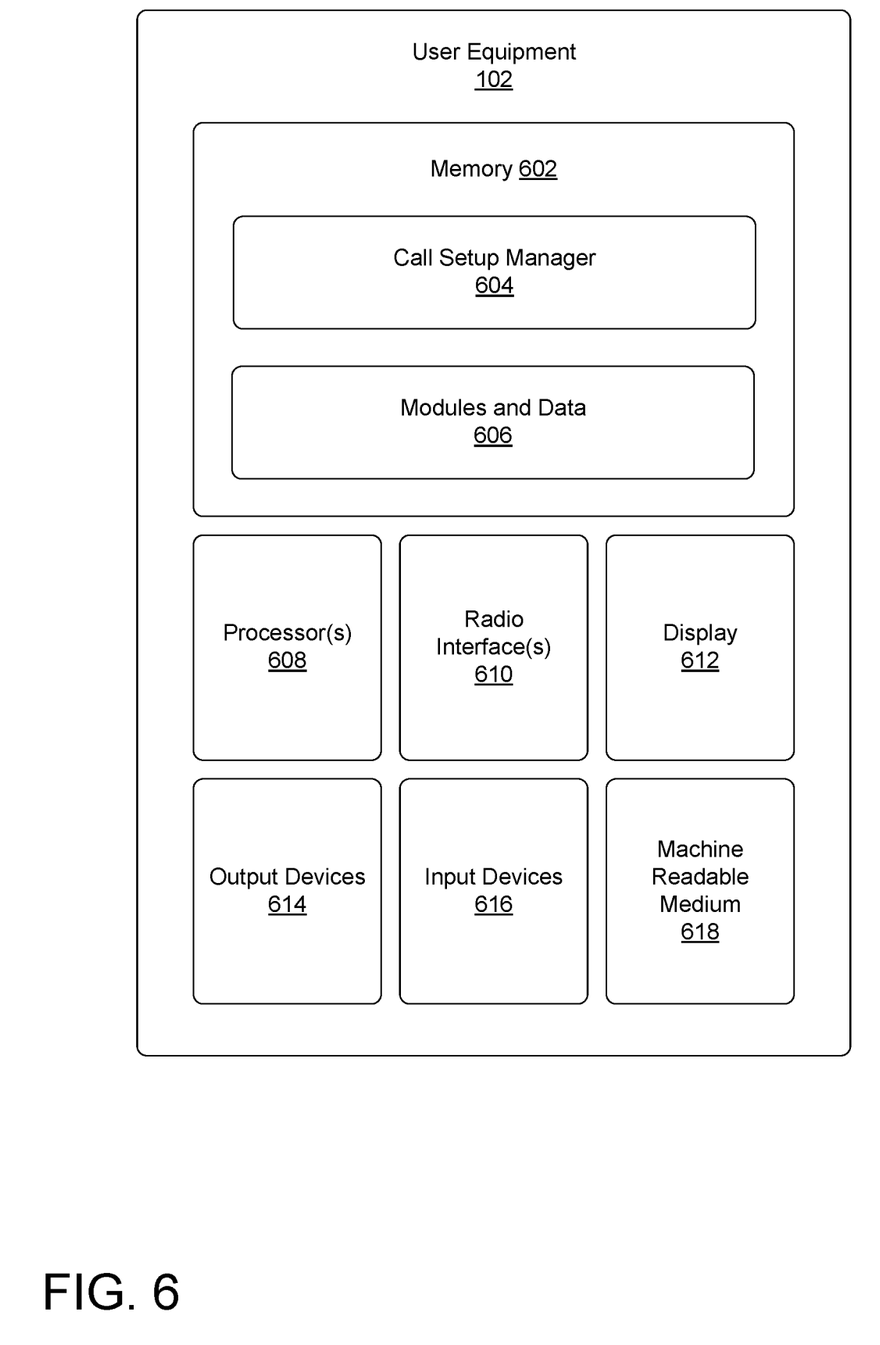
FIG. 6 depicts an example system architecture for a user equipment.

FIG. 6 depicts an example system architecture for a UE 102, in accordance with various examples. As shown, a UE 102 can have memory 602 storing a call setup manager 604, and other modules and data 606. A UE 102 can also comprise processor(s) 608, radio interfaces 610, a display 612, output devices 614, input devices 616, and/or a machine readable medium 618.

In various examples, the memory 602 can include system memory, which may be volatile (such as RAM), non-volatile (such as ROM, flash memory, etc.) or some combination of the two. The memory 602 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 604 can send and/or receive messages comprising RCS service including SIP messages associated with setup and management of a call session via the IMS. The SIP messages can include any of the SIP messages shown in FIG. 5, and/or other SIP messages.

The other modules and data 606 can be utilized by the UE 102 to perform or enable performing any action taken by the UE 102. The modules and data 606 can include a UE platform, operating system, and applications, and data utilized by the platform, operating system, and applications.

In various examples, the processor(s) 608 can be a central processing unit (CPU), a graphics processing unit (GPU), or both CPU and GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing all computer applications stored in the memory 602, which can be associated with common types of volatile (RAM) and/or nonvolatile (ROM) memory.

The radio interfaces 610 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 610 can be compatible with multiple radio access technologies, such as 5G radio access technologies and 4G/LTE radio access technologies. Accordingly, the radio interfaces 610 can allow the UE 102 to connect to the 5G system 104 described herein.

The display 612 can be a liquid crystal display or any other type of display commonly used in UEs 102. For example, display 612 may be a touch-sensitive display screen, and can then also act as an input device or keypad, such as for providing a soft-key keyboard, navigation buttons, or any other type of input. The output devices 614 can include any sort of output devices known in the art, such as the display 612, speakers, a vibrating mechanism, and/or a tactile feedback mechanism. Output devices 614 can also include ports for one or more peripheral devices, such as headphones, peripheral speakers, and/or a peripheral display. The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 618 can store one or more sets of instructions, such as software or firmware, that embodies any one or more of the methodologies or functions described herein. The instructions can also reside, completely or at least partially, within the memory 602, processor(s) 608, and/or radio interface(s) 610 during execution thereof by the UE 102. The memory 602 and the processor (s) 608 also can constitute machine readable media 618.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
   receiving, by a server of a fifth generation telecommunications network, a first message from a first user equipment (UE) indicating a Rich Communication Services (RCS) request to a second UE and a third UE;
   determining, by the server, that the first UE is associated with a first operating system and that the second UE is associated with a second operating system different from the first operating system;
   generating, by the server and based at least in part on an RCS protocol, a group chat between the first UE, the second UE, and the third UE over the fifth generation telecommunications network, the group chat comprising at least one of: text, an image, a video, or a file transfer;
   receiving, by the server, a second message from the first UE indicating a request to not receive data associated with the group chat from the second UE;
   formatting, by the server and based at least in part on the second message, the group chat for sending to the first UE, the second UE, and the third UE as a formatted group chat; and
   sending, by the server, the formatted group chat to the first UE, the second UE, and the third UE based at least in part on the RCS protocol.

2. The method of claim 1, wherein:
   the second message from the first UE further indicates a request to receive the data from the third UE as part of the group chat, and
   formatting the group chat for sending comprises augmenting the group chat for recognition by the first operating system of the first UE, the second operating system of the second UE, and a third operating system of the third UE based at least in part on the second message.

3. The method of claim 2, wherein the formatted group chat enables the first UE to communicate with the third UE and the second UE to communicate with the third UE independent of the first UE exchanging the data with the second UE.

4. The method of claim 1, further comprising:
   accessing, by the server, a first identification value associated with the first UE, a second identification value associated with the second UE, and a third identification value associated with the third UE; and
   identifying, by the server and based at least in part on the first identification value, the second identification value, and the third identification value, the first operating system associated with the first UE, the second operating system associated with the second UE, and a third operating system associated with the third UE, wherein formatting the group chat for sending is further based at least in part on the identifying.

5. The method of claim 1, wherein:
the second message from the first UE further indicates a request to receive the data associated with the group chat from the third UE, the third UE associated with a third operating system different from the first operating system associated with the first UE, and
formatting the group chat for sending comprises augmenting the group chat for recognition by the first operating system of the first UE, the second operating system of the second UE, and a third operating system of the third UE based at least in part on the second message.

6. The method of claim 1, further comprising:
receiving a third message from the second UE indicating a request to leave the group chat; and
formatting, by the server and based at least in part on the third message, the group chat to enable communication between the first UE and the third UE.

7. The method of claim 1, further comprising:
receiving a third message from a fourth UE to enter the group chat, the fourth UE comprising a same operating system as the first UE; and
formatting, by the server and based at least in part on the third message, the group chat for sending to the first UE, the second UE, the third UE, and the fourth UE as a formatted group chat.

8. The method of claim 1, wherein the server comprises a short message service center.

9. A system comprising:
one or more processors; and
memory storing computer-executable instructions that, when executed by the one or more processors, cause the system to perform operations comprising:
receiving, by a server of a fifth generation telecommunications network, a first message from a first user equipment (UE) indicating a Rich Communication Services (RCS) request to a second UE and a third UE;
determining, by the server, that the first UE is associated with a first operating system and that the second UE is associated with a second operating system different from the first operating system;
generating, by the server and based at least in part on an RCS protocol, a group chat between the first UE, the second UE, and the third UE over the fifth generation telecommunications network, the group chat comprising at least one of: text, an image, a video, or a file transfer;
receiving, by the server, a second message from the first UE indicating a request to not receive data associated with the group chat from the second UE;
formatting, by the server and based at least in part on the second message, the group chat for sending to the first UE, the second UE, and the third UE as a formatted group chat; and
sending, by the server, the formatted group chat to the first UE, the second UE, and the third UE based at least in part on the RCS protocol.

10. The system of claim 9, wherein:
the second message from the first UE further indicates a request to receive the data from the third UE as part of the group chat, and
formatting the group chat for sending comprises augmenting the group chat for recognition by the first operating system of the first UE, the second operating system of the second UE, and a third operating system of the third UE based at least in part on the second message.

11. The system of claim 9, the operations further comprising:
accessing, by the server, a first identification value associated with the first UE, a second identification value associated with the second UE, and a third identification value associated with the third UE; and
identifying, by the server and based at least in part on the first identification value, the second identification value, and the third identification value, the first operating system associated with the first UE, the second operating system associated with the second UE, and a third operating system associated with the third UE,
wherein formatting the group chat for sending is further based at least in part on the identifying.

12. The system of claim 9, the operations further comprising:
receiving a third message from the second UE indicating a request to leave the group chat; and
formatting, by the server and based at least in part on the third message, the group chat to enable communication between the first UE and the third UE.

13. The system of claim 9, the operations further comprising
receiving a request from the first UE to transfer the data associated with the formatted group chat to another device associated with a same user as the first UE; and
outputting, based at least in part on the request, the data associated with the formatted group chat on the other device.

14. One or more non-transitory computer-readable media storing instructions executable by one or more processors, wherein the instructions, when executed, cause the one or more processors to perform operations comprising:
receiving, by a server of a fifth generation telecommunications network, a first message from a first user equipment (UE) indicating a Rich Communication Services (RCS) request to a second UE and a third UE;
determining, by the server, that the first UE is associated with a first operating system and that the second UE is associated with a second operating system different from the first operating system;
generating, by the server and based at least in part on an RCS protocol, a group chat between the first UE, the second UE, and the third UE over the fifth generation telecommunications network, the group chat comprising at least one of: text, an image, a video, or a file transfer;
receiving, by the server, a second message from the first UE indicating a request to not receive data associated with the group chat from the second UE;
formatting, by the server and based at least in part on the second message, the group chat for sending to the first UE, the second UE, and the third UE as a formatted group chat; and
sending, by the server, the formatted group chat to the first UE, the second UE, and the third UE based at least in part on the RCS protocol.

15. The one or more non-transitory computer-readable media of claim 14, wherein:
the second message from the first UE further indicates a request to receive the data from the third UE as part of the group chat, and
formatting the group chat for sending comprises augmenting the group chat for recognition by the first operating system of the first UE, the second operating system of the second UE, and a third operating system of the third UE based at least in part on the second message.

16. The one or more non-transitory computer-readable media of claim 14, the operations further comprising:
    accessing, by the server, a first identification value associated with the first UE, a second identification value associated with the second UE, and a third identification value associated with the third UE; and
    identifying, by the server and based at least in part on the first identification value, the second identification value, and the third identification value, the first operating system associated with the first UE, the second operating system associated with the second UE, and a third operating system associated with the third UE, wherein formatting the group chat for sending is further based at least in part on the identifying.

17. The one or more non-transitory computer-readable media of claim 14, the operations further comprising:
    receiving a third message from the second UE indicating a request to leave the group chat; and
    formatting, by the server and based at least in part on the third message, the group chat to enable communication between the first UE and the third UE.

18. The one or more non-transitory computer-readable media of claim 14, the operations further comprising:
    receiving a request from the first UE to transfer the data associated with the formatted group chat to another device associated with a same user as the first UE; and
    outputting, based at least in part on the request, the data associated with the formatted group chat on the other device.

* * * * *